(12) United States Patent
Kim et al.

(10) Patent No.: US 6,501,743 B1
(45) Date of Patent: Dec. 31, 2002

(54) APPARATUS AND METHOD OF NETWORK SYNCHRONIZATION IN ASYMMETRIC TWO-WAY SATELLITE COMMUNICATION SYSTEM

(75) Inventors: Won-Ho Kim, Taejon (KR); Jae-Young Ahn, Taejon (KR); Yong-Hoon Cho, Taejon (KR); Seong-Pal Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/421,994

(22) Filed: Oct. 20, 1999

(30) Foreign Application Priority Data

Dec. 11, 1998 (KR) ........................ 1998-54449

(51) Int. Cl.[7] ............................................. H04B 7/212
(52) U.S. Cl. ....................... 370/324; 370/503; 370/509; 455/13.1; 455/13.2
(58) Field of Search ................................ 370/324, 310, 370/315, 503, 509, 510, 512, 513, 514; 455/13.2, 12.1, 13.1

(56) References Cited

U.S. PATENT DOCUMENTS

| | | | |
|---|---|---|---|
| 5,408,504 A | | 4/1995 | Ostman ....................... 375/354 |
| 5,440,561 A | | 8/1995 | Werronen ................. 370/105.1 |
| 5,535,216 A | * | 7/1996 | Goldman et al. ........... 370/503 |
| 5,652,749 A | * | 7/1997 | Davenport et al. ......... 370/466 |
| 5,790,171 A | * | 8/1998 | Klopfer et al. ............. 725/147 |
| 5,790,939 A | * | 8/1998 | Malcolm et al. ........... 455/13.2 |
| 5,870,390 A | * | 2/1999 | Campanella ................ 370/326 |
| 5,943,324 A | * | 8/1999 | Ramesh et al. ............. 370/321 |
| 5,991,280 A | * | 11/1999 | Ichiyoshi ..................... 370/321 |
| 6,127,967 A | * | 10/2000 | Ghazvinizn et al. ........ 342/354 |
| 6,208,626 B1 | * | 3/2001 | Brewer ....................... 370/324 |
| 6,208,666 B1 | * | 3/2001 | Lawrence et al. .......... 370/503 |
| 6,347,084 B1 | * | 2/2002 | Hulyalkar et al. .......... 370/347 |

OTHER PUBLICATIONS

Dothey et al., "First Satellite Mobile Communication Trials Using BLQS–CDMA," *Proceedings of International Mobile Satellite Conference*, pp. 381–386, 1993.

Soprano, "A CDMA Synchronisation Scheme," *Proceedings of International Mobile Satellite Conference*, pp. 437–442, 1996.

Crozier et al., "Design of a Synchronous CDM Forward Link and a Quasi–Synchronous CDMA Return Link for Future Satellite Based Mobile and Personal Communication Systems," *Proceedings of International Mobile Satellite Conference*, pp. 473–478, 1996.

\* cited by examiner

Primary Examiner—Edward F. Urban
Assistant Examiner—Temica M. Davis
(74) Attorney, Agent, or Firm—Seed Intellectual Property Law Group PLLC

(57) ABSTRACT

An apparatus and method of network synchronization for synchronous burst transmission in an asymmetric two-way satellite communication system. Network synchronization information is broadcast to all remote stations using an adaptation field structure that is defined at the MPEG-2 system standard. In addition, all remote stations maintain synchronization between the central station and remote stations using network synchronization information that is located at a program clock reference part and an original program clock reference part of the adaptation field structure.

13 Claims, 9 Drawing Sheets

FIG. 9

| FIELD | NUMBER OF BITS | ALLOCATED VALUE |
|---|---|---|
| ADAPTATION_FIELD(){ | | |
|   ADAPTATION_FIELD_LENGTH | 8 | |
|   IF(ADAPTATION_FIELD_LENGTH>0){ | | X |
|     DISCONTINUITY_INDICATOR | 1 | |
|     RANDOM_ACCESS_INDICATOR | 1 | 0 |
|     ELEMENTARY_STREAM_PRIORITY_INDICATOR | 1 | X |
|     PCR_FLAG | 1 | 0 |
|     OPCR_FLAG | 1 | 1 |
|     SPLICING_POINT_FLAG | 1 | 1 |
|     TRANSPORT_PRIVATE_DATA_FLAG | 1 | 0 |
|     ADAPTATION_FIELD_EXTENSION_FLAG | 1 | 0 |
|     IF(PCR_FLAG=='1'){ | | |
|       PROGRAM_CLOCK_REFERENCE_BASE | 33 | X |
|       RESERVED | 6 | 111111 |
|       PROGRAM_CLOCK_REFERENCE_EXTENSION | 9 | X |
|     } | | |
|     IF(OPCR_FLAG=='1'){ | | |
|       ORIGINAL_PROGRAM_CLOCK_REFERENCE_BASE | 33 | X |
|       RESERVED | 6 | 111111 |
|       ORIGINAL_PROGRAM_CLOCK_REFERENCE_EXTENSION | 9 | X |
|     } | | |
|     FOR(I=0;i<N;j++){ | | |
|       STUFFING_BYTE | 8 | 0XFF |
|     } | | |
|   } | | |
| } | | |

APPARATUS AND METHOD OF NETWORK SYNCHRONIZATION IN ASYMMETRIC TWO-WAY SATELLITE COMMUNICATION SYSTEM

TECHNICAL FIELD

The present invention relates to the apparatus and method of network synchronization in an asymmetric two-way satellite communication system. More particularly, the present invention relates to an apparatus and method of network synchronization that broadcasts network synchronization information to all remote stations using adaptation field structure that is defined at the MPEG-2 system standard. In addition, all remote stations maintain synchronization between the central station and remote stations using network synchronization information that is located at a program clock reference part and an original program clock reference part of the adaptation field structure.

BACKGROUND OF THE INVENTION

In conventional satellite communication system, there are several well-known methods for network synchronization. One method is to broadcast a pilot signal from the central station to remote stations. A second method is to broadcast a synchronous word periodically. A third method is closed loop synchronous method. Another method is to use frame timing of a forward time division multiplexing (TDM) stream.

In the first method, a pilot signal is generated at the central station with the help of high-accuracy reference frequency generator at the central station, and the pilot signal is broadcast through dedicated channels. All remote stations receive the pilot signal and establish clock and frequency synchronization.

In the second method, in every frame that is composed of a number of slots, the central station broadcasts synchronous words to remote stations In the third method, every remote station transmits locally-generated transmission data symbol timing to the central station. The central station measures the error between the transmission data symbol timing and the timing generated by the standard symbol timing generator and sends the error to remote stations through forward data stream. Remote stations compensate the received error and establish timing synchronization between them and the central station.

In the final method, every remote station extracts frame timing from the received TDM stream and uses them as a transmission slot timing of burst data.

The first method is appropriate for continuous mode synchronous communications. But it deteriorates the efficiency of the frequency spectrum. The second method is problematic unless the length of a TDM frame is a multiple of the length of a slot. In addition, a system in which a number of data streams are remultiplexed and thereby the location of a synchronous word is modified is not compatible with the second method. Likewise, the final method is not compatible with a system in which a number of data streams are remultiplexed and thereby the location of a synchronous word is modified. The conventional methods are not appropriate for an asymmetrical multimedia satellite communication system such that the forward stream is a TDM stream including MPEG-2 transmission packets, the length of transmission burst at remote stations is not a multiple of the length of the MPEG-2 transmission packet, or a number of data streams are remultiplexed.

To overcome the foregoing inconveniences, the present invention generates MPEG-2 transmission packets for network synchronization using adaptation field structure and broadcasts them to remote stations. Then, the network synchronization reception part of the central station and the remote stations extract network synchronization information from the adaptation field of the broadcast network synchronization packet and obtain a reference timing. Using the reference timing, the apparatus of network synchronization in accordance with the present invention generates transmission-reception slot timings for synchronous burst transmission. If a number of data streams are remultiplexed and thereby the location of a synchronous word is modified, the error between the transmission data symbol timing and the timing generated is manipulated by the standard symbol timing generator, and the original location of the network synchronization packet is determined in order to generate transmit-receive slot timing.

SUMMARY OF THE INVENTION

The present invention to provides an apparatus and method of network synchronization in an asymmetric two-way satellite communication system, which generates MPEG-2 transmission packets for network synchronization using adaptation field structure and broadcasts them to remote stations. All remote stations maintain synchronization between the central station and the other remote stations using network synchronization information that is located at a program clock reference part and an original program clock reference part in the adaptation field structure.

An apparatus of network synchronization in asymmetric two-way satellite communication system in accordance with the present invention comprises a central station and a plurality of remote stations. A transmission part of the central station comprises network synchronization information generating means, transmission stream generation means, and transmission means. The transmission stream generation means receive the network synchronization information and generate a network synchronization packet containing the network synchronization information in adaptation field structure. The transmission means multiplex, modulate and broadcast the network synchronization packet and a transmission stream.

The reception part of the central station comprises reception processing means, reception slot timing generation means, and synchronous burst reception means. The reception processing means extract network synchronization information from the received transmission stream and generate a reference timing signal. The reception slot timing generation means receive the reference timing signal and generate a reception slot timing. The synchronous burst reception means receive the reception slot timing, measures reception timing error, and supplies the reception timing error to the transmission stream generation means.

The remote stations comprise reception processing means, transmission slot timing generating means, and synchronous burst transmitting means. The reception processing means extract network synchronization information from the received transmission stream and generate a reference timing signal. The transmission slot timing generating means generate transmission slot timing on the basis of the reference timing signal and adjusts transmission slot timing generation time on the basis of the reception timing error received from the central station. The synchronous bursts transmitting means transmit burst in synchronous with the transmission slot timing.

A method of network synchronization in an asymmetric two-way satellite communication system in accordance with the present invention basically comprises the following five steps. The first step is to make a network synchronization packet by including network synchronization information in an adaptation field structure and multiplex and then broadcast the network synchronization packet. The second step is to extract network synchronization information from the received network synchronization packet and generate a reference timing signal on the basis of the network synchronization information. The third step is to generate a reception slot timing signal at the reception part of the central station on the basis of the reference timing signal and generate transmission slot timing signal at the remote stations. The fourth step is to measure the timing error between the reception slot timing signal and the slot timing signal of the received data and transmit the measured timing error to the remote station when the remote station sends out data in synchronization with the transmission slot timing signal. The fifth step is to adjust the transmission slot timing generation time at the remote station receiving the measured timing error and to generate a transmission slot timing signal.

More particularly, in the method of network synchronization in accordance with the present, the program clock reference (PCR) area and the original program clock reference (OPCR) is replaced by the network synchronization information in the adaptation field structure. Using remultiplexers to adjust the program clock reference, the remote stations find the original location of the network synchronization packet by the difference between the program clock reference (PCR) and original program clock reference (OPCR) and the reference timing to generate burst transmission timing.

In other words, using the adaptation field that is a component of the MPEG-2 transmission stream in an asymmetric two-way satellite communication system, network synchronization packets are broadcast to all remote stations. Network synchronization information has been replaced with program clock reference (PCR) and original program clock reference (OPCR) with the help of the adaptation field that is part of the forward MPEG-2 transmission stream in the system. Each remote station obtains reference timing by processing received network synchronization packets of MPEG-2 transmission stream and generates transmission slot timing for synchronous burst transmission. After obtaining reference timing, the central station measures the error between reception slot timing and reception timing of the burst transmission and sends the error to the remote station with the help of the forward MPEG-2 transmission stream. The remote station generates transmission slot timing that is adjusted with the error.

BRIEF DESCRIPTION OF THE DRAWINGS

FIG. 9 shows a table for illustrating the structure of the adaptation field to be inserted into a packet for network synchronization.

DETAILED DESCRIPTION OF THE PREFERRED EMBODIMENTS

Figure 1:
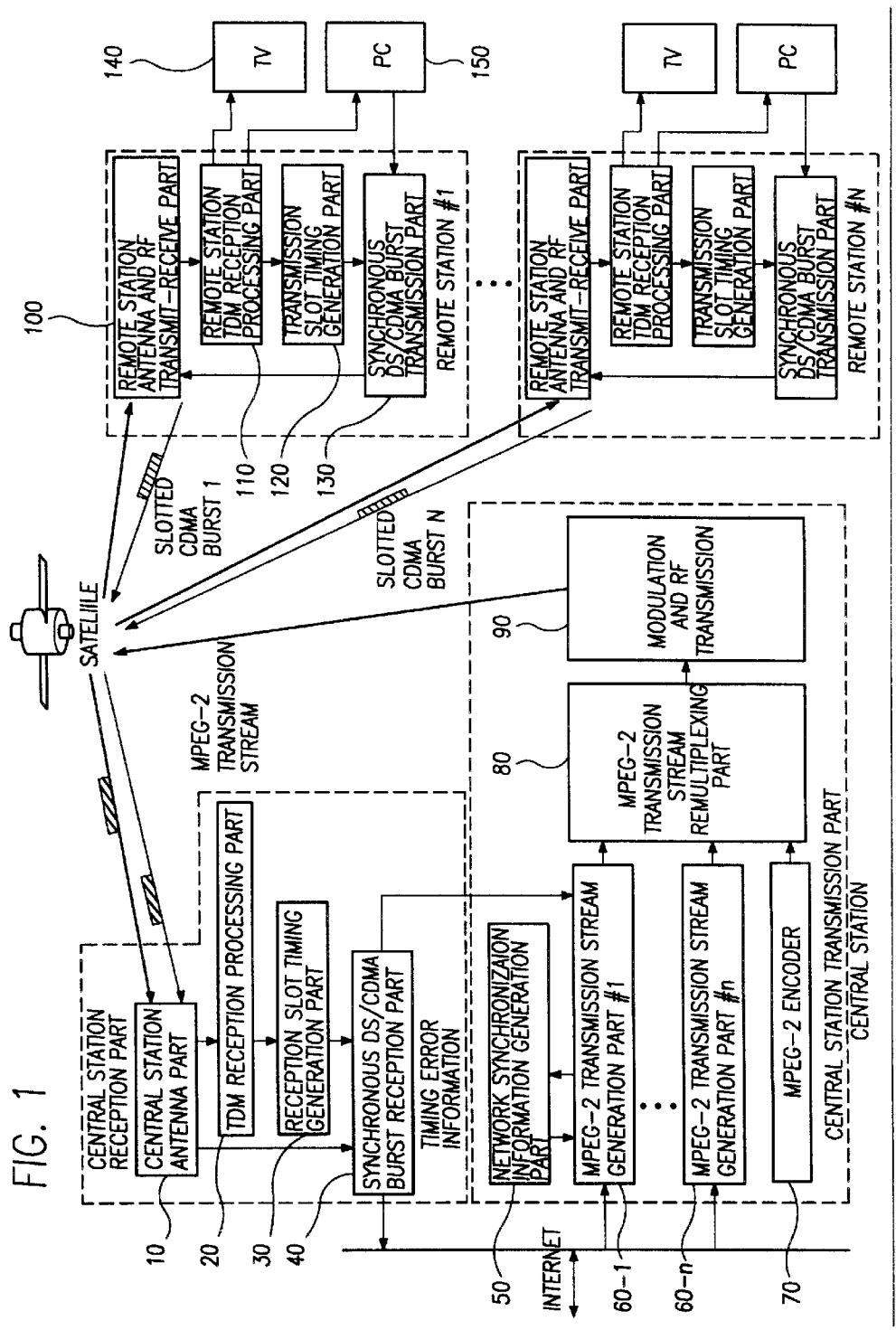
FIG. 1 shows a block diagram for explaining an asymmetric two-way satellite communication system in accordance with the present invention.

FIG. 1 shows a block diagram for explaining an asymmetric two-way satellite communication system with DS/CDMA technique in accordance with the present invention.

The asymmetrical two-way multimedia satellite communication system includes a central station and a number of remote stations. The central station comprises a transmission part and a reception part. The transmission part of the central station includes an information generation part 50, a transmission stream generation part 60, an MPEG-2 encoder 70, an MPEG-2 transmission stream remultiplexing part 80 and a modulation and RF transmission 90. The information generation part 50 generates network synchronization information of the system and multiplexes them to send as an MPEG-2 transmission stream. The reception part of the central station includes a RF reception and central station antenna part 10, a TDM reception processing part 20, a reception slot timing generation part 30, and a synchronous DS/CDMA burst reception part 40. The TDM reception processing part 20 separates network synchronous information and generates reference timing. The reception slot timing generation part 30 uses the reference timing and generates reception slot timing. The synchronous DS/CDMA burst reception part 40 uses the reception slot timing to measure burst reception timing error.

The remote stations include a remote station antenna and RF transmit-receive part 100, a remote station TDM reception processing part 110, a transmission slot timing generation part 120, a synchronous DS/CDMA burst transmission part 130, a television set 140, and a personal computer 150. The remote station TDM reception processing part 110 separates network synchronous information and generates reference timing. The transmission slot timing generation part 120 uses the reference timing and generates slot timing. The synchronous DS/CDMA burst transmission part 130 transmits a DS/CDMA burst with synchronization of the generated slot timing. The television set 140 displays video/audio broadcasting signals. The personal computer 150 processes multimedia data.

Figure 2:
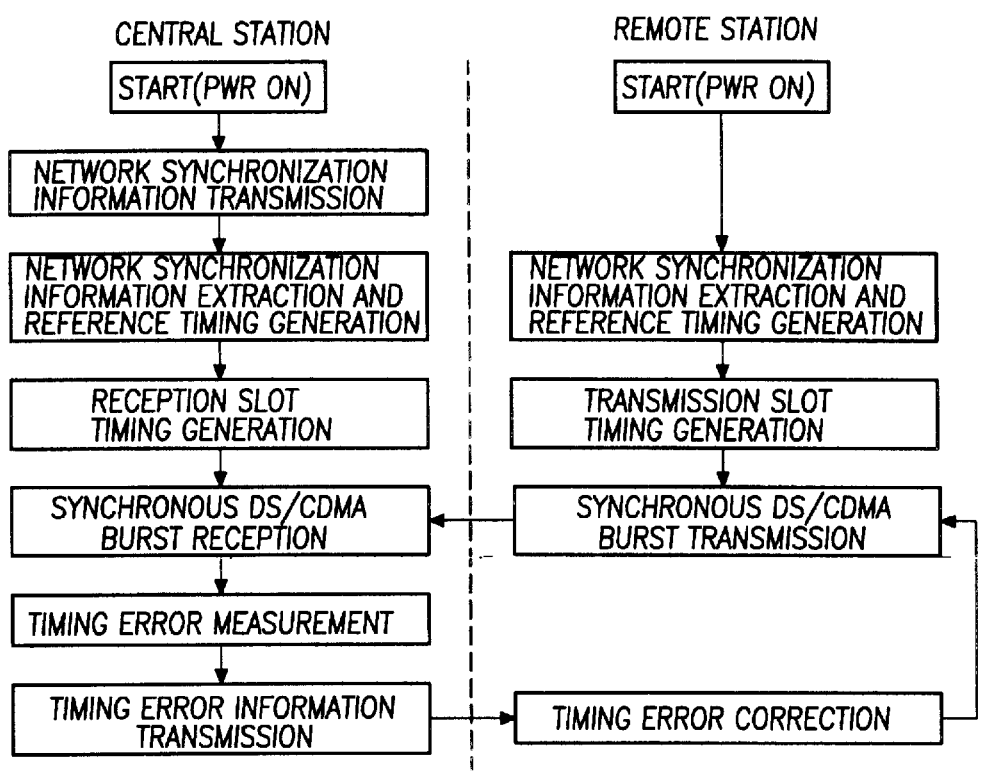
FIG. 2 shows a flow diagram for illustrating the method of network synchronization in the asymmetric two-way satellite communication system of FIG. 1.

FIG. 2 shows a flow diagram for illustrating the method of network synchronization in an asymmetric two-way satellite communication system in accordance with the present invention.

When power is loaded to the remote stations, the multimedia data transmission part at the central station periodically generates an MPEG-2 transmission stream, including network synchronization information, and broadcasts it to the remote stations. The CDMA reception part of each remote station and the central station receives the MPEG-2 transmission stream at the same time and obtains reference timing. Then, the CDMA reception part of the central part generates a reception slot through the reception slot timing generation part 30 and supplies it to the synchronous DS/CDMA burst reception part 40. Using extracted network synchronization information, the remote station generates the transmission slot timing through the transmission slot timing generation part 120 and supplies them to the synchronous DS/CDMA burst transmission part 130. At this moment, if there exists multimedia data for the remote station to transmit, the multimedia data is to be transmitted to the central station with synchronization of the transmission slot timing. At the central station, an error between the reception slot timing and the burst reception timing is measured. This measured timing error is supplied to the MPEG-2 transmission stream generation part 60-1 of multimedia data transmission part at the central station. The measured error is finally supplied to the remote station through the forward MPEG-2 transmission stream. Once the error is arrived at the remote station, the transmission slot timing generation time is to be adjusted, and then the adjusted transmission slot timing is to be supplied.

Figure 3:
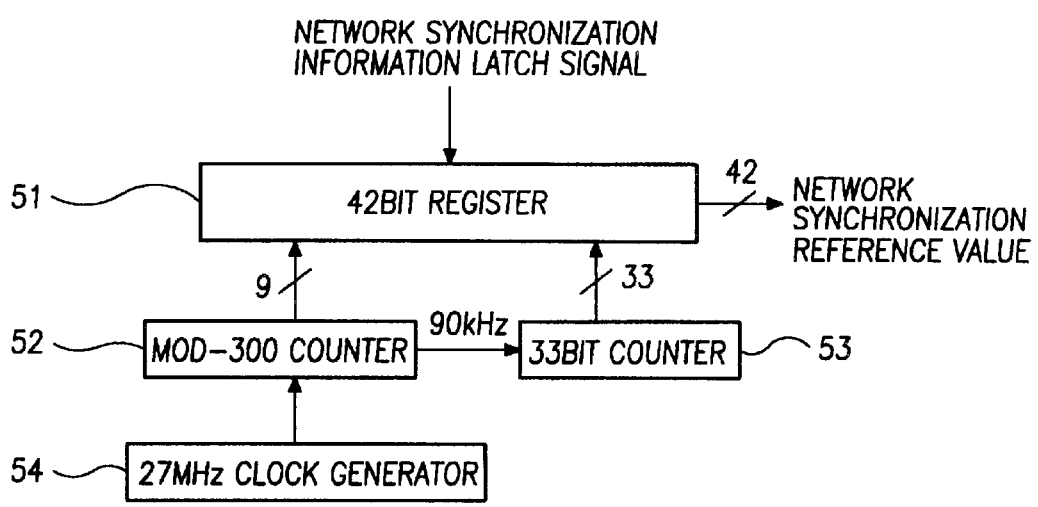
FIG. 3 shows a block diagram for explaining the network synchronization information generation part of the central station.

FIG. 3 shows a block diagram for explaining the network synchronization information generation part of the central station.

The network synchronization information generation part 50 includes a 27 MHz clock generator, a MOD-300 counter, a 33-bit counter, and a 42-bit register 51. Once the power is turned on, the 42-bit counter counts reference clocks repeatedly. The 42-bit register 51 latches the output value of the counter according to the periodic network synchronous information latch signal and then makes output to the MPEG-2 transmission stream generation part 60.

The MPEG-2 transmission stream generation part 60 counts the number of packets of the output MPEG-2 transmission stream and generates information latch signals. The interval between the periodical network synchronization information latch signals is variable. The MPEG-2 transmission stream generation part 60 receives latched network synchronization information. The program clock reference (PCR) area and the original program clock reference (OPCR) are replaced by the 42-bit network synchronization information in the adaptation field structure that is shown in FIG. 9. The MPEG-2 transmission stream generation part 60 organizes the packet for network synchronization and multiplexes them to make output to MPEG-2 transmission stream. In the MPEG-2 transmission stream generation part 60, the program identifier (PID) of the MPEG-2 transmission packet containing adaptation field for network synchronization is different from the PID of general transmission packet. Now, the MPEG-2 transmission stream demultiplexer 112 at TDM reception process part 110 of the remote station recognizes that network synchronization information has been inserted.

The MPEG-2 transmission stream is multiplexed by the MPEG-2 transmission stream remultiplexer 80 and then modulated through the modulation part and RF transmission part 90. The modulated signal is then sent out to satellites.

The MPEG-2 transmitted stream sent out by the central station is received by all remote stations and the reception part of the central station. Network synchronization information is extracted and then used to generate transmission slot timing and reception slot timing.

Detailed diagrams of the TDM reception processing part 20, reception slot timing generation part 30, remote station TDM reception processing part 10, and transmission slot timing generation part 120 are shown in FIG. 4, FIG. 5, FIG. 6, and FIG. 7.

Figure 4:
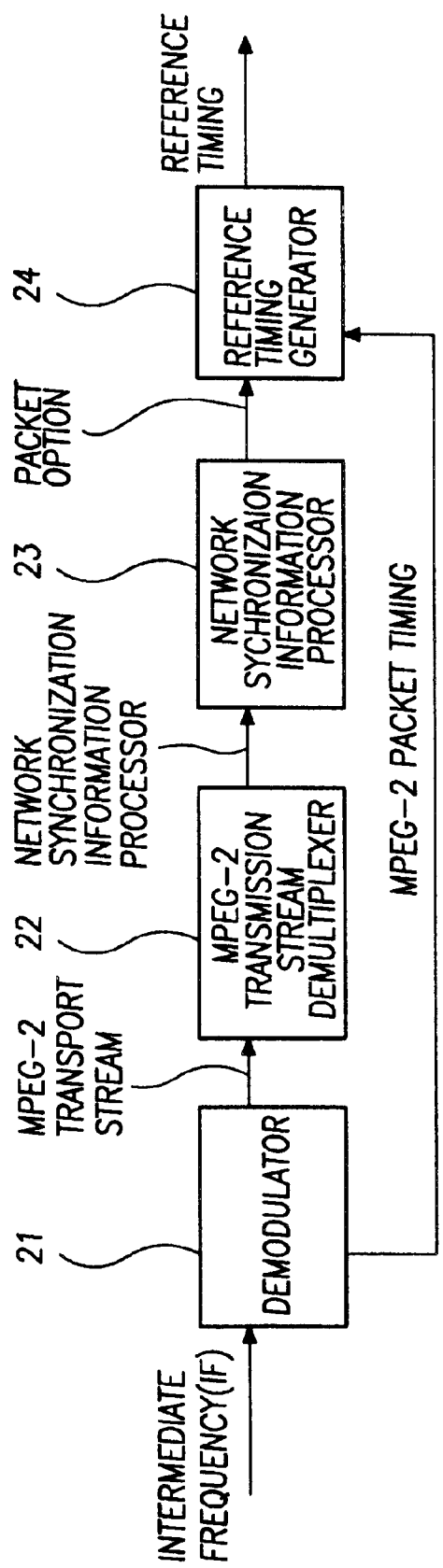
FIG. 4 shows a block diagram for explaining the TDM reception processing part of the central station.

As shown in FIG. 4, central station TDM reception processing part 20 includes a demodulator 21, an MPEG-2 transmission stream demultiplexer 22, a network synchronization information processor 23, and a reference timing generator 24.

When an intermediate frequency (IF) is supplied to the demodulator 21 through the central station antenna and RF reception part 10, the intermediate frequency is demodulated by the demodulator 21 to baseband frequency and then supplied to the MPEG-2 transmission stream demultiplexer 22. At the same time, the demodulator 21 generates the MPEG-2 packet timing and supplies it to the reference timing generator 24.

The MPEG-2 transmission stream demultiplexer 22 extracts the network synchronization packet by the program identifier (PID) of the network synchronization packet. The network synchronization reference value contained in the 42-bit PCR of adaptation field of the network synchronization packet and the original network synchronization reference value of the 42-bit OPCR of adaptation field of the network synchronization packet are extracted and supplied to the network synchronization information processor 23.

The network synchronization information processor 23 calculates the packet offset information that is necessary to determine reference timing starting time with the following procedures.

1) Deviation of time between network synchronization reference value and original network synchronization reference value is obtained using equation 1.

deviation of time=network synchronization reference value−original network synchronization reference value   [Equation 1]

2) Using the result of the equation 1 and equation 2, normalized number of packets is obtained.

normalized number of packets=(deviation of time×$R_{remux}$)/($PK\text{-}T_{length}$×27,000,000)   [Equation 2]

where $R_{remux}$ is the output speed of MPEG-2 transmission stream remultiplexer and $PKT_{length}$ is the number of bits of MPEG-2 transmission stream packet.

3) On the basis of the normalized number of packets and packets corresponding to the maximum delay time of the network synchronization packet generated from the MPEG-2 transmission stream remultiplexer, the deviation of packet interval is determined from equation 3.

deviation of packet interval=packets of the maximum delay in remultiplexer−normalized number of packets   [Equation 3]

after obtaining deviation of packet interval, numbers below decimal point are cut off.

Reference timing generator 24 counts the MPEG-2 transmission stream packets supplied from the demodulator on the basis of the deviation of packet interval and generates the reference timing of network synchronization. The reference timing of network synchronization is directed to the reception slot timing generator 30 or the transmission slot timing generator 120.

By way of example, a communication system has the following specifications. An MPEG-2 transmission stream is composed of one hundred transmission packets. Each transmission packet is 204 bytes in length. An adaptation field with network synchronization timing is inserted into every transmission packet. The output speed of the MPEG-2 transmission stream remultiplexer is 20 Mbps and the number of packets corresponding to the maximum delay time of the network synchronization packet is 5. When the PCR of the received program is 11,200 and the OPCR is 1,200, the deviation of packet interval of reference timing is obtained as follows.

1) Deviation of time=11,200−1,200=10,000
2) Normalized number of packets=(10,000×20M)/(204× 8×27M)=4.53−>4
3) reference timing deviation of packet interval=5−4=1

Continuous packet timing is used as network synchronization reference timing after counting MPEG-2 packet timing from the demodulator 21 by one that is the reference timing deviation of packet interval in this embodiment. The reference timing of network synchronization is directed to the reception slot timing generator 30 or the transmission slot timing generator 120.

Figure 7:
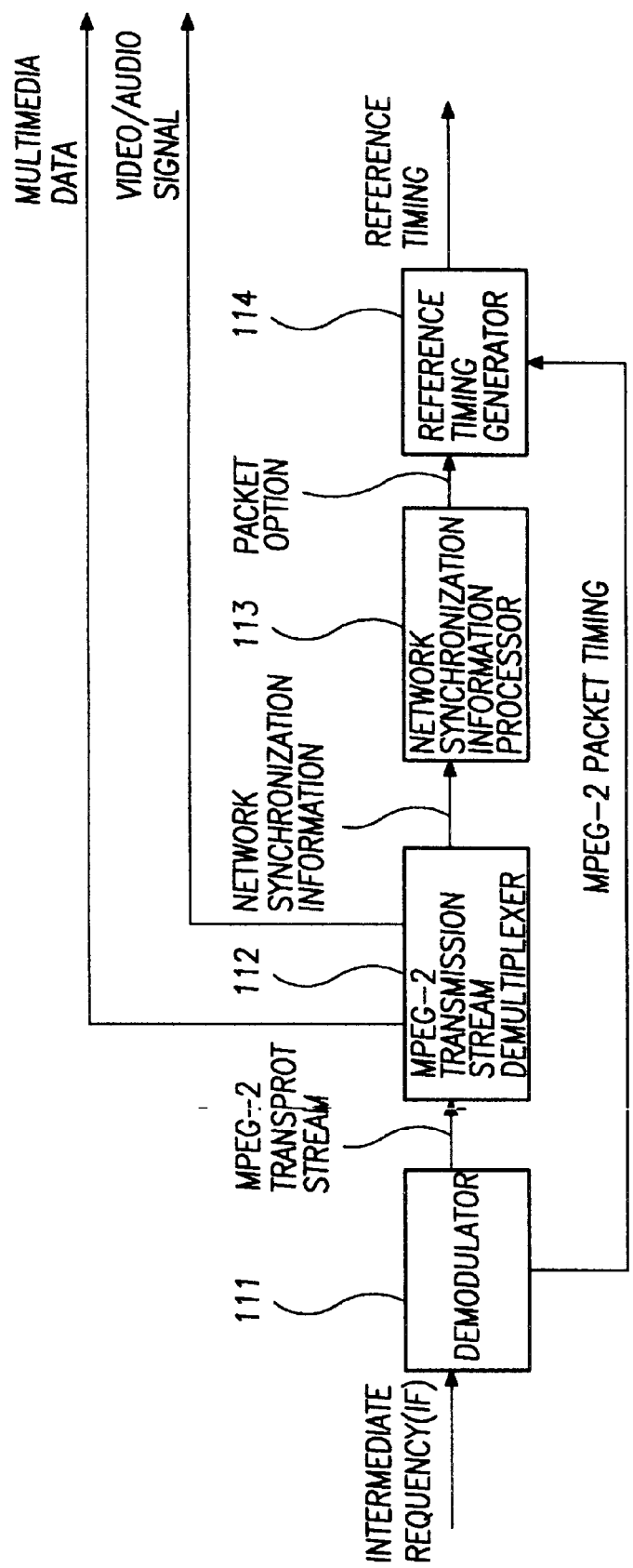
FIG. 7 shows a block diagram for explaining the transmission slot timing generation part of a remote station.
Figure 8:
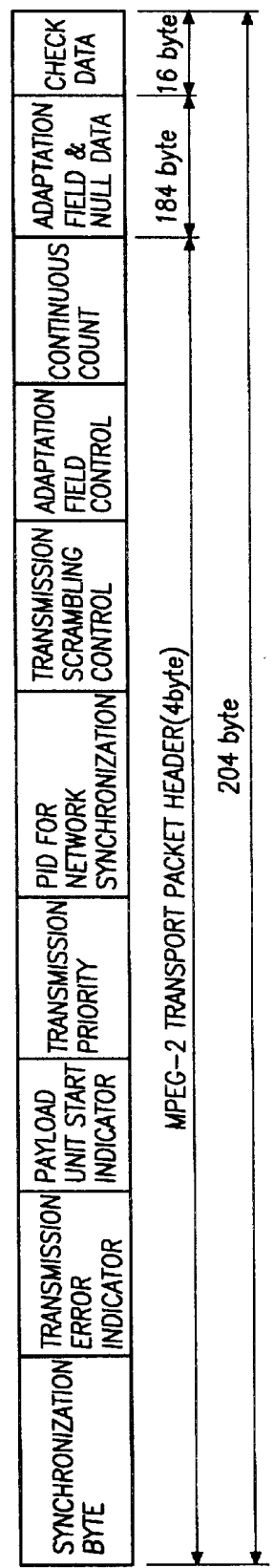
FIG. 8 shows a diagram for illustrating the structure of the MPEG-2 transmission packet for network synchronization.

As shown in the FIG. 7, the TDM reception processing part 110 of the remote station includes a demodulator 111, an MPEG-2 transmission stream demultiplexer 112, a network synchronization information processor 113, and a reference timing generator 114.

The TDM reception processing part 110 of the remote station performs the same operations as the counterpart in the central station. The only difference between the two is the interface where the multimedia data and video/audio signals from the demultiplexer 112 are supplied to the TV 140 and PC 150.

Figure 6:
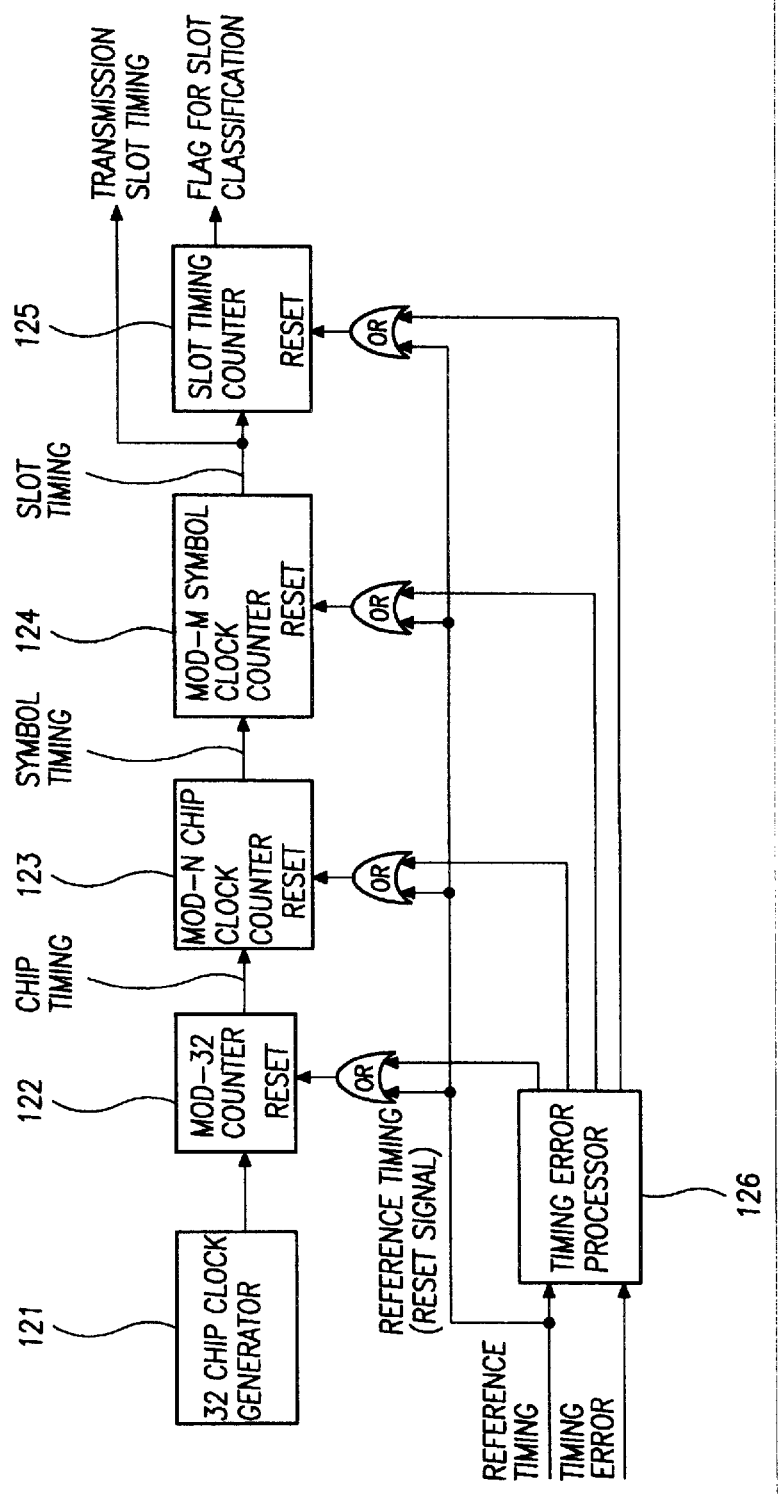
FIG. 6 shows a block diagram for explaining the reception slot timing generation part of a remote station.

As shown in FIG. 6, the transmission slot timing generation part 120 includes a multiple of 32 chip clock generator 121, a MOD-32 counter 122, a MOD-N chip clock counter 123, a MOD-M symbol clock counter 124, a slot timing counter 125, and a timing error processor 126.

The MOD-32 counter 122 counts chip clocks generated by the multiple of 32 chip clock generator 121 and generates chip timing for the MOD-N chip clock counter 123. The MOD-N chip clock counter 123 counts chip timing supplied by the MOD-32 counter 122 and provides symbol timing for MOD-M symbol clock counter 124. The MOD-M symbol clock counter 124 counts the symbol timing supplied from the MOD-N chip clock counter 123 and provides slot timing. The slot timing is used as the transmission slot timing and initiates operation of the slot timing counter 125. The slot timing counter 125 counts slot timing supplied from the MOD-M symbol clock counter 124 and generates a flag for slot classification signals that classify K access slots and L traffic slots. (N, M, K, L are integers). The reference timing is obtained and frames of K+L slots are repeated with respect to the reference timing. A timing difference occurs because burst reception timing of remote stations received by the central station differs from the reception slot timing due to various geographical locations of remote stations. Such timing difference is measured at the synchronous DS/CDMA burst reception part of the central station 40. Then, the measured timing difference is multiplexed with forward stream and sent out to the remote station. The timing error includes four slot timing error (8-bit), symbol timing error (8-bit), chip timing error (8-bit), and accurate chip timing error (8-bit).

The timing error received at the remote station is supplied to the timing error processing part 126 at the transmission slot timing generation part 120. The timing error processing unit 126 receives reference timing and timing error and sends a control signal to reset counters 122, 123, 124, 125 for error compensation. The reset signals are generated and loaded with the sequence of the MOD-32 counter 122, the MOD-N chip clock counter 123, the MOD-M symbol clock counter 124, and the slot timing counter 125.

The timing error processor 126 counts accurate chip error of MOD-32 resolution with respect to the reference timing signal and generates a reset signal for the MOD-32 counter 122. The timing error processor 126 counts the chip timing error and generates a reset signal for the MOD-N chip clock counter 123. The timing error processor 126 counts symbol timing error and generates a reset signal for MOD-M symbol clock counter 124. The timing error processor 126 counts the slot timing error and generates a reset signal for the MOD-M symbol clock counter 124. By these operations, transmission slot timing adjusted to the 1/32 resolution of chop clock is generated and network synchronization between the central station and remote stations is maintained.

Figure 5:
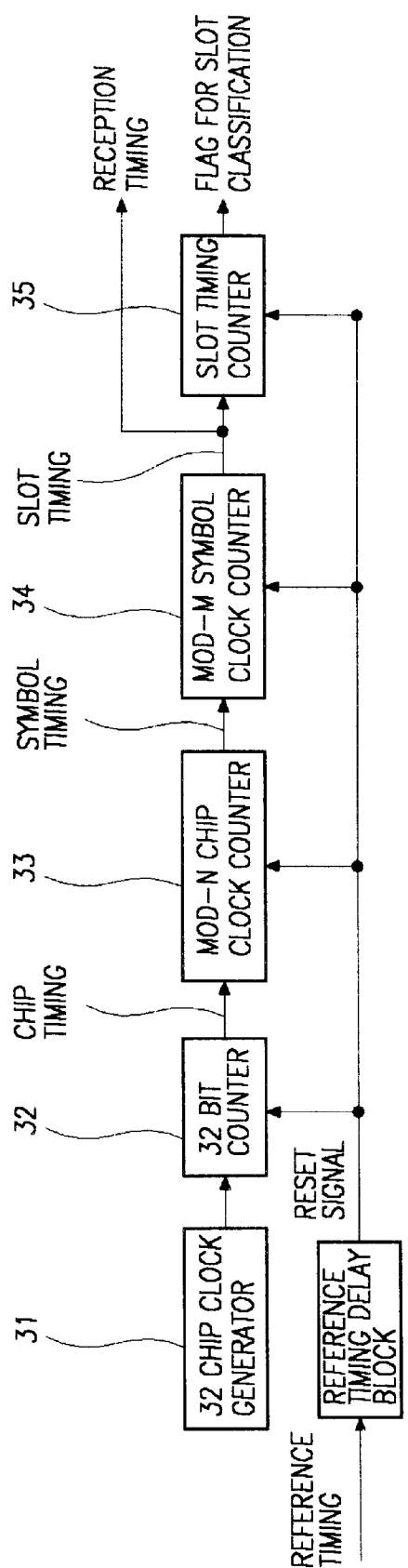
FIG. 5 shows a block diagram for explaining the reception slot timing generation part of the central station.

As shown in the FIG. 5, the reception slot timing generation part 30 of the central station includes a multiple of 32 chip clock generator 31, a 32-bit counter 32, a MOD-N chip clock counter 33, a MOD-M symbol clock counter 34, a slot timing counter 35, and a reference timing delay block 36. The differences between the transmission slot timing generation part of the central station and the transmission slot timing generation part of the remote station are the timing error processor 126 of the transmission slot timing generation part of the remote station and the reference timing delay block of the central station for compensation of satellite propagation delay (about 250 ms). The central station does not adjust timing error because reception slot timing generation part 30 of the reception part at the central station is used for the synchronization of the overall system.

Although preferred embodiments of the invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for network synchronization in an asymmetric two-way satellite communication system comprising a central station and a plurality of remote stations:
   wherein said central station includes a transmission part and a reception part, said transmission part comprising:
      means for generating network synchronization information,
      transmission stream generation means for receiving said network synchronization information and generating a network synchronization packet containing said network synchronization information in an adaptation field structure, and
      transmission means for multiplexing, modulating and broadcasting said network synchronization packet and a transmission stream; and said reception part comprising:
         reception processing means for extracting network synchronization information from the received transmission stream and generating a reference timing signal,
         reception slot timing generation means for receiving said reference timing signal and generating reception slot timing, and
         synchronous burst reception means for receiving said reception slot timing, measuring reception timing error, and supplying said reception timing error to said transmission stream generation means, and
      wherein each remote station comprises
         reception processing means for extracting network synchronization information from the received transmission stream and generating a reference timing signal;
         means for generating transmission slot timing on the basis of said reference timing signal and adjusting transmission slot timing generation time on the basis of the reception timing error received from said central station; and means for transmitting burst in synchronous with said transmission slot timing, wherein said network synchronization information generation means latches an output value of a counter in accordance with the periodic network synchronous information latch signal supplied from said transmission stream generation means, and comprises means for generating reference clocks, a first counting means for supplying a value counted according to said reference clocks and means for latching the output value of said first counter in accordance with latch signal information supplied from said transmission stream generation means.

2. The apparatus of claim 1, wherein said transmission stream generation means replaces a program clock reference (PCR) area and an original program clock reference (OPCR) in an adaptation field structure with said network synchronization information and generates a network synchronization packet.

3. The method of claim 2, wherein the program identifier (PID) for the network synchronization is different from the program identifier (PID) for general packets containing video, audio, or multimedia.

4. The apparatus of claim 2, wherein said transmission stream generation means establishes a program identifier (PID) for said network synchronization to make a distinction between said network synchronization packets and general packets containing video, audio, or multimedia.

5. The apparatus of claim 1, wherein said reception processing means of both said central station and said remote stations comprise:

demodulating means demodulating down converted intermediate frequency signals to transmission stream signals in baseband frequency and supplying transmission stream and packet timing signals;

demultiplexing means demultiplexing the transmission stream of said demodulating means and supplying network synchronization information;

network synchronization information processing means for calculating deviation of packet interval on the basis of said network synchronization information supplied by said demultiplexing means; and reference timing generating means for counting packet timing supplied by said demultiplexing means on the basis of said deviation of packet interval and supplying reference timing signals for network synchronization.

6. The apparatus of claim 5, wherein said demultiplexing means extract packets for network synchronization on the basis of said program identifier (PID) established, extract original network synchronization reference value and network synchronization reference value of adaptation field contained in said network synchronization packet, and supply said original network synchronization reference value and said network synchronization reference value to said network synchronization information processing means.

7. The apparatus of claim 6, wherein said network synchronization information processing means calculate deviation of time by subtraction of the original said network synchronization reference value from said network synchronization reference value, normalization of the number of transmission packets using said deviation of time, and calculate deviation of packet interval by subtraction of said normalized number of transmission packets from the number of packets of the maximum delay of said transmission part of said central station.

8. The apparatus of claim 1, wherein said transmission slot timing generation means comprise:

a first chip clock generation means for generating chip clocks;

a second counting means for counting said chip clocks and generating chip timing;

a third counting means for counting said chip timing and generating symbol timing;

a fourth counting means for counting said symbol timing and supplying slot timing;

a fifth counting means for counting said symbol timing and supplying flag for slot classification; and timing error processing means for receiving said reference timing and said timing error and controlling reset of said second counting means or said fifth counting means for error compensation.

9. The apparatus of claim 8, wherein said timing error includes four slot timing errors, a symbol timing error, a chip timing error, and an accurate chip timing error.

10. The apparatus of claim 9, wherein said timing error processing means supply reset signals to said second counting means, said third counting means, said fourth counting means, and said fifth counting means sequentially to reset said counting means.

11. The apparatus of claim 1, wherein said reception slot timing generation means comprise:

a second chip clock generation means for generating chip clocks;

a sixth counting means for counting said chip clocks and generating chip timing;

a seventh counting means for counting said chip timing and generating symbol timing;

a eighth counting means for counting said symbol timing and supplying slot timing;

a ninth counting means for counting said symbol timing and supplying flag for slot classification; and a reference timing delay means for compensation of satellite propagation delay and supplying reset signal for restarting counters.

12. A method of network synchronization for synchronous burst an transmission in an asymmetric two-way satellite communication system comprising:

generating a network synchronization packet by including network synchronization information in an adaptation field structure and multiplexing and then broadcasting said network synchronization packet;

extracting network synchronization information from the received network synchronization packet and generating a reference timing signal on the basis of the network synchronization information, wherein in generating the network synchronization packet, a program clock reference (PCR) area and original program clock reference (OPCR) area are replaced with the network synchronization information in the adaptation field structure to make the network synchronization packet;

generating a reception slot timing signal at the reception part of said central station on the basis of the reference timing signal and generating a transmission slot timing signal at the remote stations;

measuring a timing error between the reception slot timing signal and the slot timing signal of the received data and transmitting the measured time error to the remote station when the remote station sends out data in synchronization with the transmission slot timing signal; and adjusting the transmission slot timing generation time at the remote station receiving the measured timing error and generating a transmission slot timing signal, wherein extracting network synchronization information comprises:

demodulating down converted-intermediate frequency signals to transmission stream signals in baseband frequency and supplying a transmission stream and packet timing signals, demultiplexing the transmission stream of the demodulating means and supplying the transmission stream and packet timing signal, calculating a deviation of a packet interval on the basis of the network synchronization information, and counting packet timing supplied by the demultiplexing means on the basis of the deviation of the packet interval and supplying reference timing signals for network synchronization, wherein demultiplexing the transmission stream comprises:

extracting packets for network synchronization of the basis of a program identifier (PID) established, and extracting an original network synchronization reference value and network synchronization reference value of the adaptation field contained in the network synchronization packet.

13. The method of claim 12, wherein calculating a deviation comprises:

calculating deviation of time by subtraction the original network synchronization reference value from the network synchronization reference value;

normalizing transmission packets using the deviation of time; and calculating a deviation of the packet interval by subtraction of the normalized number of transmission packets from the number of packets of the maximum delay of the transmission part of the central station.

* * * * *

UNITED STATES PATENT AND TRADEMARK OFFICE
CERTIFICATE OF CORRECTION

PATENT NO.    : 6,501,743 B1
DATED         : December 31, 2002
INVENTOR(S)   : Won-Ho Kim et al.

It is certified that error appears in the above-identified patent and that said Letters Patent is hereby corrected as shown below:

Column 10,
Line 45, "an transmission in an asymmetric" should read as -- transmission in an asymmetric --.
Lines 3 and 4, "of the basis" should read as -- on the basis --.

Signed and Sealed this

Eighteenth Day of March, 2003

JAMES E. ROGAN
*Director of the United States Patent and Trademark Office*